(12) United States Patent
Murschall et al.

(10) Patent No.: US 6,881,470 B2
(45) Date of Patent: Apr. 19, 2005

(54) TRANSPARENT, SEALABLE, FLAME-RETARDANT POLYESTER FILM, METHOD FOR THE PRODUCTION AND USE THEREOF

(75) Inventors: Ursula Murschall, Nierstein (DE); Ulrich Kern, Ingelheim (DE); Andreas Stopp, Ingelheim (DE); Guenther Crass, Taunusstein (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/182,456

(22) PCT Filed: Jan. 10, 2001

(86) PCT No.: PCT/EP01/00206
§ 371 (c)(1),
(2), (4) Date: Jul. 26, 2002

(87) PCT Pub. No.: WO01/60611
PCT Pub. Date: Aug. 23, 2001

(65) Prior Publication Data
US 2003/0099846 A1 May 29, 2003

(30) Foreign Application Priority Data
Feb. 19, 2000 (DE) .......................................... 100 07 730

(51) Int. Cl.⁷ .......................... B32B 27/08; B32B 27/18; B32B 27/36; B32B 31/16; B32B 31/30
(52) U.S. Cl. .................... 428/141; 428/213; 428/215; 428/216; 428/323; 428/331; 428/480; 428/910; 428/346; 428/347; 428/349; 428/355 R; 264/288.4; 264/290.2; 106/15.05; 106/18.11; 106/18.18; 106/18.31; 106/18.14
(58) Field of Search ................................ 428/141, 213, 428/215, 216, 323, 331, 480, 910, 346, 347, 349, 335 R; 264/288.4, 290.2; 106/15.05, 18.11, 18.14, 18.18, 18.31

(56) References Cited

U.S. PATENT DOCUMENTS

| | | | | | |
|---|---|---|---|---|---|
| 3,322,716 A | * | 5/1967 | Klein et al. | .................. | 524/135 |
| 4,102,853 A | * | 7/1978 | Kawamura et al. | .......... | 524/425 |
| 5,173,357 A | * | 12/1992 | Nakane et al. | ............... | 428/220 |
| 5,248,713 A | * | 9/1993 | Lunk et al. | ................... | 524/120 |
| 5,521,236 A | * | 5/1996 | Moy et al. | ................... | 524/101 |
| 5,674,947 A | * | 10/1997 | Oishi et al. | ................... | 525/289 |
| 5,972,445 A | * | 10/1999 | Kimura et al. | .............. | 428/35.4 |
| 6,270,888 B1 | * | 8/2001 | Rutter et al. | ................. | 428/347 |
| 6,423,401 B1 | * | 7/2002 | Peiffer et al. | ................ | 428/216 |
| 6,649,247 B1 | * | 11/2003 | Murschall et al. | ........... | 428/141 |
| 6,709,731 B1 | * | 3/2004 | Murschall et al. | ........... | 428/141 |
| 2002/0150751 A1 | * | 10/2002 | Murschall et al. | ........... | 428/331 |
| 2003/0049472 A1 | * | 3/2003 | Murschall et al. | ........... | 428/480 |
| 2003/0054169 A1 | * | 3/2003 | Murschall et al. | ........... | 428/395 |

FOREIGN PATENT DOCUMENTS

| | | |
|---|---|---|
| DE | 23 46 787 A1 | 3/1975 |
| EP | 0 035 835 A1 | 9/1981 |
| EP | 0 245 207 A2 | 11/1987 |
| EP | 0 432 886 A2 | 6/1991 |
| EP | 0 503 063 A1 | 9/1992 |
| EP | 0 515 096 A2 | 11/1992 |
| EP | 0 581 970 A1 | 2/1994 |
| GB | 1 465 973 | 3/1977 |
| GB | 2 344 596 A | 6/2000 |
| JP | 10278206 A | 10/1998 |
| WO | WO 98/06575 A1 | 2/1998 |

OTHER PUBLICATIONS

Schimtz, Peter et al., "Films." Ullmann's Encyclopedia of Industrial Chemistry, 5th Ed., vol. A11 (1988), pp. 85–95, 108–110.*
W. Eberhard, S. Janocha, M.J. Hopper, K.J. Mackenzie "Polyester Films", Encyclopedia of Polymer Science & Engineering 1988 vol. 12, 2, 193–216 John Wiley & Sons.

* cited by examiner

Primary Examiner—Vivian Chen
(74) Attorney, Agent, or Firm—ProPat, L.L.C.

(57) ABSTRACT

Biaxially oriented, co-extruded polyester films comprising a base layer consisting of at least 90 wt. % thermoplastic polyester, preferably polyethylene terephthalate (PET), at least one sealable outer layer and a second non-sealable outer layer and, optionally, other intermediate layers, in addition to at least one flame-retardant agent, preferably organic phosphorous compounds. The inventive films are characterized by low inflammability, no embrittlement when subjected to thermal stress and a surface which is devoid of troublesome opacity, and are suitable for a multiplicity of uses both indoors and outside. The outer layers contain anti-blocking agents such as silicic acid having a particle diameter of preferably less than 50 nm and/or more than 2 $\mu$m. Preferably, the sealable outer layer consists of a copolyester which is made of ethylene terephthalate and ethylene isophthalate units.

31 Claims, No Drawings

TRANSPARENT, SEALABLE, FLAME-RETARDANT POLYESTER FILM, METHOD FOR THE PRODUCTION AND USE THEREOF

The invention relates to a transparent, flame-retardant, sealable, biaxially oriented polyester film, composed of at least one base layer B and of outer layers A and C applied to the two sides of this base layer. The film also comprises at least one flame retardant. The invention further relates to the use of the film, and to a process for its production.

The films are particularly suitable for indoor and outdoor applications where fire protection or flame retardancy is demanded.

BACKGROUND OF THE INVENTION

Sealable, biaxially oriented polyester films are known from the prior art. Likewise known are sealable, biaxially oriented polyester films which have one or more UV absorbers. These films known from the prior art either have good sealing performance, good optical properties, or acceptable processing performance.

GB-A 1 465 973 describes a coextruded polyester film having two layers, one layer of which consists of copolyesters containing isophthalic acid and terephthalic acid, and the other layer of which consists of polyethylene terephthalate. The patent gives no useful indication of the sealing performance of the film. Lack of pigmentation means that the film cannot be produced by a reliable process (cannot be wound up) and that the possibilities for further processing of the film are limited.

EP-A 0 035 835 describes a coextruded, sealable polyester film where, in the sealable layer, particles whose average size exceeds the sealable layer thickness are present in order to improve winding and processing performance. The particulate additives form surface protrusions which prevent undesired blocking and sticking of the film to rolls or guides. No further details are given concerning the incorporation of antiblocking agents in relation to the other, nonsealable layer of the film. It is uncertain whether this layer comprises antiblocking agents. The choice of particles having diameters greater than the sealable layer thickness, at the concentrations given in the Examples, impairs the sealing performance of the film. The patent does not give any indication of the sealing temperature range of the film. The seal seam strength is measured at 140° C. and is in the range from 63 to 120 N/m (from 0.97 N/15 mm to 1.8 N/15 mm of film width).

EP-A 0 432 886 describes a coextruded multilayer polyester film which has a first surface on which has been arranged a sealable layer, and has a second surface on which has been arranged an acrylate layer. The sealable outer layer here may also be composed of isophthalic-acid-containing and terephthalic-acid-containing copolyesters. The coating on the reverse side gives the film improved processing performance. The patent gives no indication of the sealing temperature range of the film. The seal seam strength is measured at 140° C. For a sealable layer thickness of 11 μm the seal seam strength given is 761.5 N/m (11.4 N/15 mm). A disadvantage of the reverse-side acrylate coating is that this side is no longer sealable with respect to the sealable outer layer, and the film therefore has only very restricted use.

EP-A 0 515 096 describes a coextruded, multilayer, sealable polyester film which comprises a further additive on the sealable layer. The additive may comprise inorganic particles, for example, and is preferably distributed in an aqueous layer onto the film during its production. Using this method, the film is claimed to retain its good sealing properties and to be easy to process. The reverse side comprises only very few particles, most of which pass into this layer via the recycled material. This patent again gives no indication of the sealing temperature range of the film. The seal seam strength is measured at 140° C. and is above 200 N/m (3 N/15 mm). For a sealable layer of 3 μm thickness the seal seam strength given is 275 N/m (4.125 N/15 mm).

WO 98/06575 describes a coextruded, multilayer polyester film which comprises a sealable outer layer and a nonsealable base layer. The base layer here may have been built up from one or more layers, and the inner layer of these layers is in contact with the sealable layer. The other (outward-facing) layer then forms the second nonsealable outer layer. Here, too, the sealable outer layer may be composed of isophthalic-acid-containing and terephthalic-acid-containing copolyesters, but these comprise no antiblocking particles. The film also comprises at least one UV absorber, which is added to the base layer in a weight ratio of from 0.1 to 10%. Preferred UV absorbers used here are triazines, e.g. âTinuvin 1577 from Ciba. The base layer has conventional antiblocking agents. The film has good sealability, but does not have the desired processing performance and also has unsatisfactory optical properties, such as gloss and haze.

DE-A 23 46 787 describes a flame-retardant polymer. Besides the polymer, the use of the polymer is also described for producing films and fibers. The following shortcomings are apparent when this phospholane-modified polymer is used in film production The polymer mentioned is susceptible to hydrolysis and has to be very thoroughly predried. When the polymer is dried using dryers of the prior art it cakes, and production of a film is therefore impossible except under very difficult conditions.

The films thus produced under uneconomic conditions embrittle when exposed to heat, i.e. their mechanical properties are severely impaired by embrittlement, making the film unusable. This embrittlement occurs after as little as 48 hours of exposure to heat.

It was an object of the present invention to provide a transparent, flame-retardant, sealable and biaxially oriented polyester film which does not have the disadvantages of the films mentioned as the prior art, and in particular has a combination of advantageous properties, such as very good sealability, a cost-effective production process, improved processability, and improved optical properties. In particular, it should be flame-retardant and not embrittle on exposure to heat.

It was an object of the present invention to extend the sealing temperature range of the film to low temperatures, to increase the seal seam strength of the film, and at the same time to provide better film handling than that known from the prior art. It should also be ensured that the processability of the film extends to high-speed processing machinery. It should be possible for regrind produced directly during film production to be introduced to the extrusion process at a concentration of up to 60% by weight, based on the total weight of the film, without any significant resultant adverse effect on the physical properties of the film.

Flame retardancy means that in what is known as a fire protection test the transparent film complies with the conditions of DIN 4102 Part 2 and in particular the conditions of DIN 4102 Part 1, and can be classified in Construction Materials Classes B2, and in particular B1 for low-flammability materials.

The film is also intended to pass the UL 94 test (Vertical Burning Test for Flammability of Plastic Material), permitting its classification into class 94 VTM-0. This means that 10 seconds after removal of the Bunsen burner the flame has ceased to burn, after 30 seconds no smoldering is observed, and no burning drops occur.

Cost-effective production includes the capability of the raw materials or raw material components needed to produce the flame-retardant film to be dried using industrial dryers of the prior art. It is important that the raw materials do not cake or become thermally degraded. These industrial dryers of the prior art include vacuum dryers, fluidized-bed dryers, and fixed-bed dryers (tower dryers).

These dryers operate at temperatures of from 100 to 170° C., at which the flame-retardant polymers mentioned in the prior art cake, making film production impossible.

In the vacuum dryer, which has the gentlest drying conditions, the raw material for the film passes through a temperature range of from about 30 to 130° C. under a vacuum of 50 mbar. What is known as post-drying is then required, in a hopper at temperatures of from 100 to 130° C. with a residence time of from 3 to 6 hours. Even here, the polymer mentioned cakes to an extreme extent.

No embrittlement on exposure to heat means that after 100 hours of a heat-conditioning procedure at 100° C. in a circulating-air oven the film has not embrittled and does not have disadvantageous mechanical properties. The good mechanical properties include high modulus of elasticity ($E_{MD}$>3200 N/mm$^2$; $E_{TD}$>3500 N/mm$^2$), and also good values for tensile stress at break (in MD>100 N/mm$^2$; in TD>130 N/mm$^2$).

BRIEF DESCRIPTION OF THE INVENTION

According to the invention, the object is achieved by providing a flame-retardant, biaxially oriented, sealable polyester film with at least one base layer B, with a sealable outer layer A, and with another outer layer C located on the other side of the base layer B, where the sealable outer layer A preferably has a minimum sealing temperature below 110° C., and preferably has a seal seam strength of at least 1.3 N/15 mm, and the film comprises at least one flame retardant or a mixture of various flame retardants.

DETAILED DESCRIPTION OF THE INVENTION

The flame retardant present in the film of the invention is preferably fed directly during film production by way of what is known as masterbatch technology, the concentration of the flame retardant, based on the weight of the layers in which the flame retardant is present, being from 0.5 to 30% by weight, preferably from 1 to 20% by weight.

According to the invention, the film preferably has three layers, the layers then encompassed being the base layer B, the sealable outer layer A, and the non-sealable outer layer C. The film of the invention may have additional intermediate layers.

The base layer B of the film is composed of a thermoplastic, preferably of at least 90% by weight of a thermoplastic polyester. Polyesters suitable for this purpose are composed of ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters composed of at least 90 mol %, in particular at least 95 mol %, of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layers A and/or C.

Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO2—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$–C$_{19}$ alkanediacids are particularly suitable, and the alkane moiety here may be straight-chain or branched.

One way of preparing these polyesters according to the invention is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols (W. Eberhard, S. Janocha, M. J. Hopper, K. J. Mackenzie, "Polyester Films", in Encyclopaedia of Polymer Science & Engineering Volume 12, 2, 193–216 (1988), John Wiley & Sons).

The sealable outer layer A applied by coextrusion to the base layer B has been built up on the basis of polyester copolymers and essentially consists of copolyesters composed predominantly of isophthalic acid units and of terephthalic acid units, and of ethylene glycol units. The remaining monomer units derive from other aliphatic, cycloaliphatic or aromatic diols and, respectively, dicarboxylic acids, as may also occur in the base layer. Preferred copolyesters are those which have been built up from ethylene terephthalate units and from ethylene isophthalate units. The proportion of ethylene terephthalate is preferably from 40 to 95 mol %, and the corresponding proportion of ethylene isophthalate is preferably from 60 to 5 mol %. Particular preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

For the other, nonsealable outer layer C, or for any intermediate layers present, use may in principle be made of the polymers described above for the base layer B.

The desired sealing and processing properties of the novel film are obtained from the combination of properties of the copolyester used for the sealable outer layer and from the topographies of the sealable outer layer A and the nonsealable outer layer C.

The minimum sealing temperature of preferably below 110° C. and the seal seam strength of preferably at least 1.3 N/15 mm are achieved when the copolymers described in more detail above are used for the sealable outer layer A.

The films have their best sealing properties when no other additives, in particular no inorganic or organic fillers, are added to the copolymer. In this case, with the copolyester given above, the lowest minimum sealing temperature and the highest seal seam strengths are obtained. However, the handling of the film is poorer in this case, since the surface of the sealable outer layer A tends to block. The film can hardly be wound and has little suitability for further processing on high-speed packaging machinery. To improve handling of the film, and processability, it is necessary to modify the sealable outer layer A. This is best done with the aid of suitable antiblocking agents of a selected size, which are added to the sealable layer at a particular concentration, and specifically in such a way as to firstly minimize blocking and secondly give only insignificant impairment of sealing properties. This desired combination of properties can be achieved in particular when the topography of the sealable outer layer A is characterized by the following set of parameters:

The roughness of the sealable outer layer, characterized by the $R_a$ value, should be less than 30 nm, otherwise the sealing properties are adversely affected for the purposes of the present invention.

The value measured for gas flow should be from 500–4000 s. At values below 500 s the sealing properties are adversely affected for the purposes of the present invention, and at values above 4000 s the handling of the film becomes poor.

For further improvement in the processing performance of the sealable film, the topography of the nonsealable outer layer C should be characterized by the following set of parameters:

The coefficient of friction (COF) of this side with respect to itself should be below 0.5, otherwise the winding performance and further processing of the film are unsatisfactory.

The roughness of the nonsealable outer layer, characterized by the $R_a$ value, should be above 40 nm and below 100 nm. Values below 40 nm have an adverse effect on the winding and processing performance of the film, and values above 100 nm impair the optical properties (gloss, haze) of the film.

The value measured for gas flow should be below 120 s. At values above 120 s the winding and processing performance of the film is adversely affected.

The number of elevations N per $mm^2$ of film surface has the following correlation with their respective heights h:

$$0.29-3.30*\log h/\mu m < \log N/mm^2 < 1.84-2.70*\log h/\mu m \quad 0.01 \mu m < h < 10 \mu m$$

If the values for N are below those corresponding to the left-hand side of the equation, the winding and processing performance of the film is adversely affected, and if the values for N are above those corresponding to the right-hand side of the equation, the gloss and haze of the film are adversely affected.

The film of the invention comprises at least one flame retardant, which is fed by way of what is known as masterbatch technology directly during film production, the concentration of flame retardant here ranging from 0.5 to 30.0% by weight, preferably from 1.0 to 20.0% by weight, based on the weight of the layer of the crystallizable thermoplastic. The ratio of flame retardant to thermoplastic during preparation of the masterbatch is generally maintained at from 60:40 to 10:90% by weight.

Typical flame retardants include bromine compounds, chloroparaffins, and other chlorine compounds, antimony trioxide, and aluminum trihydrates, but the use of the halogen compounds here is disadvantageous due to the occurrence of halogen-containing by-products. The low light resistance of the films provided with these materials is moreover a great disadvantage, as is the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise the optical properties required are not complied with.

Since the flame retardants generally have some susceptibility to hydrolysis, the additional use of a hydrolysis stabilizer may be advisable.

The hydrolysis stabilizers used are generally phenolic stabilizers, alkali metal/alkaline earth metal stearates, and/or alkali metal/alkaline earth metal carbonates in amounts of from 0.01 to 1.0% by weight. The preferred amount of phenolic stabilizers is from 0.05 to 0.6% by weight, in particular from 0.15 to 0.3% by weight, and their preferred molar mass is above 500 g/mol. Particularly advantageous compounds are pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene. Mixtures of these hydrolysis stabilizers may also be used.

It was surprising that the use of masterbatch technology, appropriate predrying and/or precrystallization, and, where appropriate, use of small amounts of a hydrolysis stabilizer can produce a flame-retardant and thermoformable film with the property profile demanded in a cost-effective manner and with no caking in the dryer, and that the film does not embrittle on exposure to heat, and does not fracture when creased.

It was also surprising that
within the accuracy of measurement, the Yellowness Index of the film is unchanged from that of an unmodified film, during film production there are no releases of gases, nor any die deposits, nor any condensation of frames, and the film therefore has excellent optical properties, an exceptional profile, and outstanding layflat, and the flame-retardant film has excellent stretchability, and can therefore be produced in a reliable and stable manner on high-speed film lines at speeds of up to 420 m/min.

With this, a film of this type is also cost-effective.

It should also be emphasized that it is even possible to reuse the regrind without any adverse effect on the Yellowness Index of the film.

In one preferred embodiment, the film of the invention comprises a crystallizable polyethylene terephthalate as thermoplastic polyester, from 1 to 20% by weight of an organophosphorus compound flame retardant soluble in the polyethylene terephthalate, and from 0.1 to 1.0% by weight of a hydrolysis stabilizer, each % by weight being based on the weight of the layers in which these substances are present. The statements concerning the hydrolysis stabilizer are generally applicable, and are also applicable to other polyesters to be used according to the invention.

In the three-layer embodiment, the flame retardant is preferably present in the nonsealable outer layer C. However, the base layer B and/or the sealable outer layer A, and any intermediate layers present, may, if required, also have flame retardants.

Fire protection tests to DIN 4012 and the UL test have shown that, in the case of a three-layer film, in order to achieve adequate flame retardancy it is fully sufficient for flame retardant to be provided in the outer layers whose thickness is preferably from 0.3 to 2.5 $\mu m$.

The flame-retardant, multilayer films, produced by known coextrusion technology, are therefore of greater economic interest than monofilms modified using high concentrations throughout, since markedly less flame retardant is needed.

During film production, it was found possible to produce the flame-retardant film without any caking in the dryer, preferably by way of masterbatch technology, if appropriate predrying or precrystallization of the masterbatch, and using small concentrations of hydrolysis stabilizer.

Surprisingly, measurements have moreover shown that the film of the invention does not embrittle on exposure to heat at 100° C. over a prolonged period. This result may be attributed to the synergistic action of appropriate precrystallization, predrying, masterbatch technology, and hydrolysis stabilizer.

The film of the invention is, moreover, recyclable without difficulty, without pollution of the environment, and without loss of mechanical properties, and examples of its uses therefore are as short-lived advertising placards, in the construction of exhibition stands, and for other promotional items, where fire protection is desired.

Surprisingly, compliance of the films of the invention with construction materials classes B2 and B1 to DIN 4102 and with the UL 94 test extends to the thickness range from 5 to 300 μm.

According to the invention, the flame retardant is preferably added by way of masterbatch technology. The flame retardant is dispersed in a carrier material. Carrier materials which may be used are the respective polyester used, or else other polymers compatible therewith.

It is important in masterbatch technology that the grain size and the bulk density of the masterbatch are similar to the grain size and the bulk density of the thermoplastic to permit uniform distribution and therefore uniform flame retardancy.

It is important for the invention that the masterbatch which comprises the flame retardant and, where appropriate, the hydrolysis stabilizer, is precrystallized or predried. This predrying includes gradual heating of the masterbatch at subatmospheric pressure (from 20 to 80 mbar, preferably from 30 to 60 mbar, in particular from 40 to 50 mbar), with stirring, and, where appropriate, post-drying at a constant elevated temperature, likewise at subatmospheric pressure. It is preferable for the masterbatch to be charged at room temperature from the feed vessel in the desired blend together with the polymers of the base and/or outer layers and, where appropriate, with other components of the raw material, batchwise into a vacuum dryer which traverses a temperature profile of from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

The base layer B and any intermediate layers present may also comprise conventional additives, such as stabilizers and/or antiblocking agents. The two outer layers A and C also comprise conventional additives, e.g. stabilizers and/or antiblocking agents. They are advantageously added to the polymer or polymer mixture before melting begins. Examples of stabilizers used are phosphorus compounds, such as phosphoric acid or phosphoric esters.

Suitable antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc, or manganese salts of the dicarboxylic acids used, carbon black, titanium dioxide, kaolin, crosslinked polystyrene particles and crosslinked arcrylate particles.

Other antiblocking agents which may be selected are mixtures of two or more different antiblocking agents, and mixtures of antiblocking agents of identical makeup but different particle size. The particles may be added to each layer of the film in the respective advantageous concentrations, e.g. as a glycolic dispersion during polycondensation, or by way of masterbatches during extrusion.

Preferred particles are $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, and/or particles with an average primary particle diameter above 1 μm, preferably above 1.5 μm and particularly preferably above 2 μm. However, the average particle diameter of these particles described last should not be above 5 μm.

To achieve the abovementioned properties of the sealable film, it has also proven to be appropriate to select a particle concentration in the base layer B which is lower than in the two outer layers A and C. In a three-layer film of the type mentioned the particle concentration in the base layer B will be from 0 to 0.15% by weight, preferably from 0 to 0.12% by weight and in particular from 0 to 0.10% by weight. There is no restriction in principle on the diameter of the particles used, but particular preference is given to particles with an average diameter above 1 μm.

In its advantageous usage form, the film is composed of three layers: the base layer B and, applied on both sides of this base layer, outer layers A and C, and outer layer A is sealable with respect to itself and with respect to outer layer C.

To achieve the property profile mentioned for the film, the outer layer C preferably has more pigment (i.e. a higher pigment concentration) than the outer layer A. The pigment concentration in this outer layer C is from 0.1 to 1.0% by weight, advantageously from 0.12 to 0.8% by weight and in particular from 0.15 to 0.6% by weight. In contrast, the other outer layer A, which is sealable and positioned opposite to the outer layer C, has a lower degree of filling with inert pigments. The concentration of the inert particles in layer A is from 0.01 to 0.2% by weight, preferably from 0.015 to 0.15% by weight and in particular from 0.02 to 0.1% by weight.

Between the base layer and the outer layers there may, if desired, also be intermediate layers, preferably one intermediate layer. This may again be composed of the polymers described for the base layers. In one particularly preferred embodiment, it is composed of the polyester used for the base layer. It may also comprise the additives described. The thickness of an intermediate layer is generally above 0.3 μm, preferably in the range from 0.5 to 15 μm, in particular in the range from 1.0 to 10 μm and very particularly preferably in the range from 1.0 to 5 μm.

In the particularly advantageous three-layer embodiment of the novel film, the thickness of the outer layers A and C is generally above 0.1 μm, and is generally in the range from 0.2 to 4.0 μm, advantageously in the range from 0.2 to 3.5 μm, in particular in the range from 0.3 to 3 μm and very particularly preferably in the range from 0.3 to 2.5 μm, and the thicknesses of the outer layers A and C may be identical or different.

The total thickness of the novel polyester film may vary within wide limits. It is preferably from 3 to 80 µm, in particular from 4 to 50 µm, particularly preferably from 5 to 30 µm, the layer B preferably making up from 5 to 90% of the total thickness.

In producing the film, it is appropriate for the polymers for the base layer B and the two outer layers A and C to be introduced separately to three extruders. Any foreign bodies or contamination present may be filtered out from the polymer melt prior to extrusion. The melts are then extruded through a coextrusion die to give flat melt films, and layered one upon the other. The multilayer film is then drawn off and solidified with the aid of a chill roll and, if desired, other rolls.

The invention therefore also provides a process for producing the novel polyester film by the coextrusion process known per se.

The procedure for this process is that the melts corresponding to the individual layers of the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and the additives used may already be present in the polymer or the polymer mixture during this process. The melts are then simultaneously extruded through a flat-film die (slot die), and the extruded multilayer film is drawn off on one or more take-off rolls, whereupon it cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from about 80 to 130° C., and the transverse stretching at from about 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good sealing properties it has proven advantageous for the planar orientation Δp of the film to be equal to or less than 0.165, but particularly less than 0.163. In this case the strength of the film in the direction of its thickness is so great that when the seal seam strength is measured it is specifically the seal seam which separates, and the tear does not enter the film or propagate therein.

The significant variables affecting the planar orientation Δp have been found to be the longitudinal and transverse stretching parameters, and also the SV (standard viscosity) of the raw material used. The process parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation Δp obtained with a machine is 0.167 with the following set of parameters: $\lambda_{MD}$=4.8 and $\lambda_{TD}$=4.0, a longitudinal stretching temperature $T_{MD}$ of from 80–118° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation Δp within the desired range. The film web speed here is 340 m/min and the SV (standard viscosity) of the material is about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a temperature of from about 150 to 250° C. The film is then wound up in a usual manner.

After the biaxial stretching it is preferable for one or both surfaces of the film to be corona- or flame-treated by one of the known methods. The intensity of the treatment generally gives a surface tension in the range above 45 mN/m.

The film may also be coated in order to achieve other desired properties. Typical coatings are layers with adhesion-promoting, antistatic, slip-improving or release action. These additional layers may, of course, be applied to the film by way of in-line coating, using aqueous dispersions, prior to the transverse stretching step.

The novel film has excellent sealability, very good flame resistance, very good handling properties and very good processing performance. The sealable outer layer A of the film seals not only with respect to itself (fin sealing) but also with respect to the nonsealable outer layer C (lap sealing). The minimum sealing temperature for the lap sealing here is only about 10° C. higher than the fin-sealing temperature, and the reduction in the seal seam strength is not more than 0.3 N/15 mm.

The gloss and haze of the film are also improved over films of the prior art. In producing the novel film it is certain that regrind can be refed to the extrusion process at a concentration of from 20 to 60% by weight, based on the total weight of the film, without any significant adverse effect on the physical properties of the film.

The excellent sealing properties, very good handling properties and very good processing properties of the film make it particularly suitable for processing on high-speed machinery.

The outstanding combinations of properties provided by the film, moreover, make it suitable for a wide variety of different applications, for example for interior decoration, for constructing exhibition stands or for exhibition requisites, as displays, for placards, for protective glazing of machinery or of vehicles, in the lighting sector, in the fitting out of shops or the installation of shelving, or as a promotional requisite or laminating medium, or for greenhouses, roofing systems, exterior cladding, protective coverings for materials, e.g. sheet steel, applications in the construction sector, or illuminated advertising profiles, blinds, or electrical applications.

The table below (Table 1) gives once again the most important film properties of the invention at a glance.

TABLE 1

|  | Range according to the invention | Preferred | Particularly preferred | Unit | Test method |
|---|---|---|---|---|---|
| Outer layer A | | | | | |
| Minimum sealing temperature | <110 | <105 | <100 | ° C. | internal |
| Seal seam strength | >1.3 | >1.5 | >1.8 | N/15 mm | internal |
| Average roughness $R_a$ | <30 | <25 | <20 | nm | DIN 4768, cut-off 0.25 mm |
| Range of values for gas flow measurement | 500–4000 | 800–3500 | 1000–3000 | sec | internal |
| Gloss, 20° | >120 | >130 | >140 | | DIN 67 530 |
| Outer layer C | | | | | |
| COF | <0.5 | <0.45 | <0.40 | | DIN 53 375 |
| Average roughness $R_a$ | 40–100 | 45–95 | 50–90 | nm | DIN 4768, cut-off 0.25 mm |
| Range of values for gas flow measurement | <120 | <100 | <80 | sec | internal |
| Gloss, 20° | >140 | >150 | >160 | | DIN 67 530 |
| Other film properties | | | | | |
| Haze | <4 | <3 | <2.5 | % | ASTM-D 1003-52 |
| Planar orientation | <0.165 | <0.163 | <0.160 | | internal |
| Fire performance | The film complies with the requirements of construction materials classes B2 and B1 to DIN 4102 Part 2/Part 1 and passes the UL 94 test | | | | |

The following test methods were used to measure the properties of the raw materials and of the films:

DIN=Deutsches Institut für Normung
ISO=International Organization for Standardization
ASTM=American Society for Testing and Materials
SV (DCA), IV (DVE)

The standard viscosity SV (DCA) is measured in dichloroacetic acid by a method based on DIN 53726.

The intrinsic viscosity (IV) is calculated as follows from the standard viscosity $$IV(DCA)=6.67 \cdot 10^{-4} SV \cdot (DCA)+0.118$$

Determination of Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine the seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

The coefficient of friction was determined to DIN 53 375. The coefficient of sliding friction was measured 14 days after production.

Surface Tension

Surface tension was determined by what is known as the ink method (DIN 53 364).

Haze

The Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. The reflectance was measured as an optical value characteristic of a film surface. Based on the standards ASTM-D 523–78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of Particle Sizes on Film Surfaces

A scanning electron microscope and an image analysis system were used to determine the size distribution of elevations on film surfaces. Use is made of the XL30 CP scanning electron microscope from Philips with an integrated image analysis program: AnalySIS from Soft-imaging System.

For these measurements, specimens of film are placed flat on a specimen holder. These are then metalized obliquely at an angle "α" with a thin metallic layer (e.g. of silver). The symbol "α" here is the angle between the surface of the specimen and the direction of diffusion of the metal vapor. This oblique metalization throws a shadow behind the elevation. Since the shadows are not at this stage electrically conductive, the specimen is then further sputtered or metalized with a second metal (e.g. gold), the second coating here impacting vertically onto the surface of the specimen in such a way as not to produce any shadows in the second coating.

Scanning electron microscope (SEM) images are taken of the specimen surfaces prepared in this way. The shadows of the elevations are visible because of the contrast of the metallic materials. The specimen is oriented in the SEM in such a way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 mm² is evaluated.

The height of the individual elevations is computed from the individual shadow lengths using the following relationship:

$$h=(\tan \alpha)*L$$

where h is the height of the elevation, $\alpha$ is the metalization angle and L is the shadow length. The elevations recorded in this way are classified so as to arrive at a frequency distribution. The classification is into classes of 0.05 mm width between 0 and 1 mm, the smallest class (from 0 to 0.05 mm) not being used for further evaluation calculations. The diameters (dimension perpendicular to the direction of shadow throw) of the elevations are classified in a similar way in classes of 0.2 mm width from 0 to 10 mm, and here again the smallest class is used for further evaluation.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions:

| | |
|---|---|
| Test area | 45.1 cm² |
| Weight applied | 1276 g |
| Air temperature | 23° C. |
| Humidity | 50% relative humidity |
| Aggregated gas volume | 1.2 cm³ |
| Pressure difference | 56 mbar |

Determination of Planar Orientation $\Delta p$

Planar orientation is determined by measuring the refractive indices with an Abbe refractometer.

Preparation of Specimens

Specimen size and length: from 60 to 100 mm

Specimen width: corresponds to prism width of 10 mm

To determine $n_{MD}$ and $n_a(=n_z)$, the specimen to be tested has to be cut out from the film with the running edge of the specimen running precisely in the direction TD. To determine $n_{MD}$ and $n_a(=n_z)$, the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table. After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Surface Defects

Surface defects are determined visually.

Mechanical Properties

Modulus of elasticity, tear strength and elongation at break are measured longitudinally and transversely to ISO 527-1-2.

Fire Performance

The fire performance is determined to DIN 4102 Part 2, construction materials class B2, and to DIN 4102 Part 1, construction materials class B1, and also by the UL 94 test.

EXAMPLE 1

Chips made from polyethylene terephthalate (prepared by the transesterification process with Mn as transesterification catalyst, Mn concentration: 100 ppm) were dried at 150° C. to residual moisture below 100 ppm and, together with the stated masterbatches, fed to the extruder for the base layer B. Chips made from polyethylene terephthalate were likewise fed, together with the masterbatches stated, to the extruder for the nonsealable outer layer C.

Alongside this, chips were prepared from a linear polyester which is composed of an amorphous copolyester with 78 mol % of ethylene terephthalate and 22 mol % of ethylene isophthalate (prepared-via the transesterification process with Mn as transesterification catalyst, Mn concentration: 100 ppm). The copolyester was dried at a temperature of 100° C. to a residual moisture below 200 ppm and, together with the masterbatches stated, fed to the extruder for the sealable outer layer A.

The hydrolysis stabilizer and the flame retardant are fed as a masterbatch.

The masterbatch is composed of 20% by weight of flame retardant, 1% by weight of hydrolysis stabilizer and 79% by weight of polyethylene terephthalate. The hydrolysis stabilizer is pentaerythrityl tetrakis-3-(3,5-di-tert-butyl-4-hydroxylphenyl)propionate. The flame retardant is dimethyl phosphonate (®Armgard P 1045). The masterbatch has a bulk density of 750 kg/m$^3$ and a softening point of 69° C.

The masterbatch is charged at room temperature from a separate feed vessel into a vacuum dryer which from the juncture of charging to the end of residence time traverses a temperature profile of from 25 to 130° C. During the residence time of about 4 hours the masterbatch is stirred at 61 rpm. The precrystallized or predried masterbatch is post-dried in the downstream hopper, likewise under vacuum, for 4 hours at 140° C.

10% by weight of the masterbatch is added to the base layer B, and 20% by weight of the masterbatch is added to the nonsealable outer layer C.

Coextrusion, followed by stepwise longitudinal and transverse orientation, is used to produce a transparent three-layer film with ABC structure and with a total thickness of 12 μm. The thickness of each outer layer can be found in Table 2.

| Outer layer A is a mixture made from: | |
|---|---|
| 97.0% by weight of | copolymer with an SV of 800 |
| 3.0% by weight of | masterbatch made from 97.75% by weight of copolyester (SV value of 800) and 1.0% by weight of ® Sylobloc 44 H (synthetic SiO$_2$ from Grace) and 1.25% by weight of ® Aerosil TT 600 (chain-type SiO$_2$ from Degussa) |
| Base layer B: | |
| 90.0% by weight of | polyethylene terephthalate with an SV of 800 |
| 10.0% by weight of | masterbatch which comprises flame retardant and hydrolysis stabilizer |
| Outer layer C is a mixture made from: | |
| 20.0% by weight of | masterbatch which comprises flame retardant and hydrolysis stabilizer |
| 68% by weight of | polyethylene terephthalate with an SV of 800 |
| 12% by weight of | masterbatch made from 97.75% by weight of copolyester (SV value of 800) and 1.0% by weight of ® Sylobloc 44 H (synthetic SiO$_2$ from Grace) and 1.25% by weight of ® Aerosil TT 600 (chain-type SiO$_2$ from Degussa) |

The production conditions in the individual steps of the process were:
Extrusion:

| Temperatures | |
|---|---|
| A layer: | 270° C. |
| B layer: | 290° C. |
| C layer: | 290° C. |
| Die gap width: | 2.5 mm |
| Take-off roll Temperature: | 30° C. |
| Longitudinal stretching Temperature: | 80–125° C. |
| Longitudinal stretching ratio: | 4.2 |

| -continued | |
|---|---|
| Temperatures | |
| Transverse stretching Temperature: | 80–135° C. |
| Transverse stretching ratio: | 4.0 |
| Heat-setting: Temperature: | 230° C. |
| Duration: | 3 s |

The film had the required good sealing properties and exhibits the desired handling properties and the desired processing performance. The film structure and the properties achieved in films prepared in this way are given in Tables 2 and 3 (CE=Comparative Example).

After 200 hours of heat-conditioning at 100° C. in a circulating-air drying cabinet, the mechanical properties are unchanged. The film exhibits no embrittlement phenomena of any kind. The film complies with the requirements for construction materials classes B2 and B1 to DIN 4102 Part 2 and Part 1. The film passes the UL 94 test.

EXAMPLE 2

In comparison with Example 1, the outer layer thickness of the sealable layer A was raised from 1.5 to 2.0 μm. This has given improved sealing properties, and in particular the seal seam strength has increased markedly.

EXAMPLE 3

In comparison with Example 1, the film produced now had a thickness of 20 μm. The outer layer thickness for the sealable layer A was 2.5 μm and that for the nonsealable layer C was 2.0 μm. This has again improved sealing properties, and in particular the seal seam strength has increased markedly, and the handling properties of the film have improved slightly.

EXAMPLE 4

In comparison with Example 3, the copolymer for the sealable outer layer A has been changed. Instead of the amorphous copolyester with 78 mol % of ethylene terephthalate and 22 mol % of ethylene isophthalate, use was now made of an amorphous copolyester with 70 mol % of ethylene terephthalate and 30 mol % of ethylene isophthalate. The polymer was processed in a twin-screw vented extruder, without any need for predrying. The outer layer thickness for the sealable layer A was again 2.5 μm, and that for the nonsealable layer C was 2.0 μm. This has given improved sealing properties, and in particular the seal seam strength has increased markedly. To achieve good handling properties and good processing performance from the film, the pigment concentration in the two outer layers was raised slightly.

COMPARATIVE EXAMPLE 1

In comparison with Example 1, the sealable outer layer A was now not pigmented. Although this has given some improvement in the sealing properties, the handling properties of the film and its processing performance have worsened markedly.

COMPARATIVE EXAMPLE 2

In comparison with Example 1, the level of pigmentation in the sealable outer layer A was now as high as in the nonsealable outer layer C. This measure has improved the handling properties and the processing properties of the film, but the sealing properties have worsened markedly.

COMPARATIVE EXAMPLE 3 comparison with Example 1, the nonsealable outer layer C was now pigmented to a markedly lower level. The handling properties of the film and its processing performance have worsened markedly.

COMPARATIVE EXAMPLE 4

Example 1 from EP-A 0 035 835 was repeated. The sealing performance of the film, its handling properties and its processing performance are markedly poorer than in the examples according to the invention.

TABLE 2

| Example | Film thickness μm | Film structure | Layer thicknesses μm | | | Pigments in layers | | | Average pigment diameter in layers mm | | | Pigment concentrations ppm (parts by weight) | | |
|---|---|---|---|---|---|---|---|---|---|---|---|---|---|---|
| | | | A | B | C | A | B | C | A | B | C | A | B | C |
| E 1 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| E 2 | 12 | ABC | 2.0 | 8.5 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| E 3 | 20 | ABC | 2.5 | 15.5 | 2.0 | Sylobloc 44 H Aerosil TT 600 | none | Sylobloc 44 H Aerosil TT 600 | 2.5 0.04 | | 2.5 0.04 | 300 375 | 0 | 1200 1500 |
| E 4 | 20 | ABC | 2.5 | 15.5 | 2.0 | Sylobloc 44 H Aerosil TT 600 | none | Sylobloc 44 H Aerosil TT 600 | 2.5 0.04 | | 2.5 0.04 | 400 500 | 0 | 1500 1875 |
| CE 1 | 12 | ABC | 1.5 | 9 | 1.5 | none | none | Sylobloc 44 H Aerosil TT 600 | | | 2.5 0.04 | | 0 | 1200 1500 |
| CE 2 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| CE 3 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 600 750 |
| CE 4 | 15 | AB | 2.25 | 12.75 | | Gash 35 EP-A 035 635 | none | | 3 | | | 2500 | 0 | |

TABLE 3

| Example | Minimum sealing temperature °C. A side with respect to A side | Seal seam strength N/15 mm A side with respect to A side | Coefficient of friction COF C side with respect to C side | Average roughness $R_a$ nm | | Values measured for gas flow sec | | Constants A/B | | Dp | Gloss 20° C. | | Haze | Winding performance and handling properties | Processing performance |
|---|---|---|---|---|---|---|---|---|---|---|---|---|---|---|---|
| | | | | A side | C side | A side | C side | A side | C side | | A side | C side | | | |
| E 1 | 100 | 2.0 | 0.45 | 25 | 65 | 1200 | 80 | 0.5 | 3.06 | 0.165 | 140 | 170 | 2.5 | ++ | ++ |
| E 2 | 98 | 2.7 | 0.45 | 26 | 65 | 1280 | 80 | 0.5 | 3.06 | 0.165 | 140 | 170 | 2.5 | ++ | ++ |
| E 3 | 95 | 3.0 | 0.41 | 23 | 61 | 1110 | 80 | 0.5 | 3.06 | 0.165 | 130 | 170 | 3.0 | ++ | ++ |
| E 4 | 85 | 3.3 | 0.40 | 23 | 65 | 1300 | 60 | 0.5 | 3.06 | 0.165 | 130 | 170 | 3.0 | ++ | ++ |
| CE 1 | 98 | 2.1 | 0.45 | 10 | 65 | 10000 | 80 | | | 0.165 | 160 | 170 | 1.5 | − | − |
| CE 2 | 110 | 1.0 | 0.45 | 65 | 65 | 80 | 80 | | | 0.165 | 130 | 170 | 2.8 | − | − |
| CE 3 | 100 | 2.0 | 0.45 | 25 | 37 | 1200 | 150 | | | 0.165 | 160 | 190 | 1.5 | − | − |
| CE 4 | 115 | 0.97 | >2 | 70 | 20 | 50 | >5000 | | | | | | 12 | − | − |

Key to winding performance, handling properties and processing performance of films:
++: no tendency to adhere to rolls or to other mechanical parts, no blocking problems on winding or during processing on packaging machinery, low production costs
−: tendency to adhere to rolls or other mechanical parts, blocking problems on winding and during processing on packaging machinery, high production costs due to complicated handling of film in machinery

What is claimed is:

1. A polyester film which has a base layer B made from a thermoplastic polyester and has a sealable outer layer A and, located on the other side of the base layer, has a nonsealable outer layer C made from thermoplastic polymer, where the outer layers A and C comprise at least one antiblocking agent, and which comprises at least one flame retardant, said sealable outer layer exhibiting a roughness, characterized by the Ra value, of less than 30 nm and a value measured for gas flow ranging from 500 to 4000 s.

2. The polyester film as claimed in claim 1, wherein between the base layer B and outer layer A or outer layer C or outer layer A and outer layer C one or more intermediate layers are arranged.

3. The polyester film as claimed in claim 1, which has an A-B-C layer structure.

4. The polyester film as claimed in claim 1, wherein the base layer comprises at least 90% by weight of a thermoplastic polyester.

5. The polyester film as claimed in claim 4, wherein the thermoplastic polyester is polyethylene terephthalate or a polyester, at least 90 mol % of which is composed of ethylene glycol units and terephthalic acid units or of ethylene glycol units and naphthalene-2,6-dicarboxylic acid units.

6. The polyester film as claimed in claim 1, wherein the polyester for outer layer A is a copolyester which is predominantly composed of isophthalic acid, terephthalic add and ethylene glycol units.

7. The polyester film as claimed in claim 1, wherein from 40 to 95 mol % of the copolyester of the outer layer A is composed of ethylene terephthalate units, and the remainder making up 100 mol % is composed of ethylene isophthalate units.

8. The polyester as claimed in claim 1, wherein the base layer comprises no antiblocking agents, or the concentration of antiblocking agent in the base layer B is lower than in the outer layers A and C.

9. The polyester as claimed in claim 1, wherein the concentration of antiblocking agent in the nonsealable outer layer C is higher than in the sealable outer layer A.

10. The polyester as claimed in claim 1, wherein the concentration of antiblocking agent is from 0 to 0.15% by weight in the base layer B, from 0.1 to 1% by weight in the outer layer C and from 0.01 to 0.2% by weight in the outer layer A.

11. The polyester film as claimed in claim 1, wherein the average particle diameter of the antiblocking agents is below 100 nm or above 1 µm or said antiblocking agents are formed from a mixture of particles, said mixture of particles having average diameters below 100 nm and above 1 µm.

12. The polyester film as claimed in claim 1, wherein $SiO_2$ is used as antiblocking agent.

13. The polyester film as claimed in claim 1, wherein the thickness of the outer layers is identical or different and is from 0.2 to 4.0 µm.

14. The polyester film as claimed in claim 13, wherein the thickness of the outer layers is identical or different and is from 0.3 to 3 µm.

15. The polyester film as claimed in claim 13, wherein the thickness of the outer layers is identical or different and is from 0.3 to 2.5 µm.

16. The polyester film as claimed in claim 1, wherein the flame retardant is present in the base layer or in the outer layers or in the base layer and in the outer layers.

17. The polyester film as claimed in claim 1, wherein the flame retardant comprises organophosphorus compounds or mixture, of organophosphorus compounds.

18. The polyester film as claimed in claim 1, wherein the flame retardant is soluble in the thermoplastic polyester in which it is present.

19. The polyester film as claimed in claim 1 wherein the flame retardant used comprises dimethyl methylphosphonate.

20. The polyester film as claimed in claim 1, wherein the concentration of the flame retardant is from 0.5 to 30% by weight based on the weight of the layer in which it is present.

21. A polyester film as claimed in claim 20, wherein the concentration of the flame retardant is from 1 to 20% by weight based on the weight of the layer in which it is present.

22. The polyester film as claimed in claim 1, which comprises at least one hydrolysis stabilizer.

23. The polyester film as claimed in claim 22, wherein the concentration of the hydrolysis stabilizer is from 0.1 to 1% by weight, based on the weight of the layer in which it is present.

24. A process for producing a polyester film as claimed in claim 1, which comprises coextruding, through a coextrusion die, the starting materials required for producing the base and outer layers, and biaxially orienting, heat-setting and, if desired, coating the resultant film.

25. The process as claimed in claim 24, wherein the flame retardant are added using masterbatch technology.

26. The process as claimed in claim 24, wherein the hydrolysis stabilizer are added using masterbatch technology.

27. A method of making an interior decoration, a display, a placards, a protective glazing, a shop outfit, a promotional requisite, a laminating medium, an exterior cladding, a protective covering, an illuminated advertising profile, or a blind, which comprises converting a film as claimed in claim 1 into an interior decoration, a display, a placards, a protective glazing, a shop outfit, a promotional requisite, a laminating medium, an exterior cladding, a protective coveting, en illuminated advertising profile, or a blind.

28. A polyester film according to claim 1, wherein said flame retardant is present only in said outer layers A and C.

29. A polyester film which has a base layer B made from a thermoplastic polyester and has a sealable outer layer A made from a copolyester which is predominantly composed of isophthalic acid, terephthalic acid and ethylene glycol units and, located on the other side of the base layer, has a nonsealable outer layer C made from thermoplastic polymer, where the outer layers A and C comprise at least one antiblocking agent, said and blocking agent present within said C layer in a greater amount than in said A layer, said polyester film further comprising at least one flame retardant.

30. A polyester film according to claim 29, wherein said polyester film further comprises at least one hydrolysis stabilizer.

31. A polyester film which has a base layer B made from a thermoplastic polyester and has a sealable outer layer A and, located on the other side of the base layer, has a nonsealable outer layer C, where the outer layers A and C comprise at least one antiblocking agent, said polyester film further comprising a predried or precrystallized masterbatch composition that comprises at least one flame retardant, at least one hydrolysis stabilizer and a carrier material.

* * * * *